United States Patent
Gadagi

(10) Patent No.: US 11,347,630 B1
(45) Date of Patent: *May 31, 2022

(54) METHOD AND SYSTEM FOR AN AUTOMATED TESTING FRAMEWORK IN DESIGN PATTERN AND VALIDATING MESSAGES

(71) Applicant: JPMorgan Chase Bank, N.A., New York, NY (US)

(72) Inventor: Sachin Gadagi, Dist Palghar (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,254

(22) Filed: Nov. 9, 2020

(51) Int. Cl.
  *G06F 11/36* (2006.01)
  *G06F 9/54* (2006.01)
  *G06F 9/455* (2018.01)
  *G06F 11/30* (2006.01)

(52) U.S. Cl.
  CPC ...... *G06F 11/3692* (2013.01); *G06F 9/45558* (2013.01); *G06F 9/546* (2013.01); *G06F 11/302* (2013.01); *G06F 11/368* (2013.01); *G06F 11/3688* (2013.01); *G06F 2009/45562* (2013.01)

(58) Field of Classification Search
  CPC .. G06F 11/3692; G06F 11/302; G06F 11/368; G06F 9/45558; G06F 9/546; G06F 2009/45562
  USPC .................................................. 717/124–143
  See application file for complete search history.

(56) References Cited

U.S. PATENT DOCUMENTS

| | | | | |
|---|---|---|---|---|
| 6,701,514 B1* | 3/2004 | Haswell | ............ | G06F 11/3664 707/999.102 |
| 7,620,856 B2* | 11/2009 | Kagan | ................ | G06F 11/2294 714/57 |
| 7,634,726 B2* | 12/2009 | Ims | ........................ | G06Q 30/06 715/234 |
| 7,694,181 B2* | 4/2010 | Noller | ................ | G06F 11/3688 714/38.11 |

(Continued)

OTHER PUBLICATIONS

Artzi et al, "A Framework for Automated Testing of JavaScript Web Applications", ACM, pp. 571-580 (Year: 2011).*

(Continued)

*Primary Examiner* — Anil Khatri
(74) *Attorney, Agent, or Firm* — Greenblum & Bernstein, P.L.C.

(57) ABSTRACT

A method for providing an automated testing framework to validate a plurality of messages is disclosed. The method includes receiving, from a developer, an electronic resource that includes a feature file relating to a development of an application; identifying, from the electronic resource, a set of step definitions relating to a payload test assertion; annotating the set of step definitions to include a feature step definition; executing the annotated electronic resource by using an inversion-of-control container based on a configuration step definition; loading a message handler object that manages payload listening; transmitting, by using the message handler object, a message generated from the execution of the annotated electronic resource to a data structure that maintains a plurality of message queues; and validating the message based on the plurality of message queues.

20 Claims, 6 Drawing Sheets

(56) References Cited

U.S. PATENT DOCUMENTS

| | | | | |
|---|---|---|---|---|
| 8,069,435 | B1* | 11/2011 | Lai | H04L 67/16 |
| | | | | 717/106 |
| 8,230,267 | B2* | 7/2012 | Noller | G06F 11/3688 |
| | | | | 714/45 |
| 8,429,601 | B2* | 4/2013 | Andersen | G06F 8/24 |
| | | | | 717/109 |
| 8,806,437 | B2* | 8/2014 | Arcese | G06F 8/315 |
| | | | | 717/124 |
| 9,141,378 | B2* | 9/2015 | Fox | G06F 8/71 |
| 9,563,544 | B2* | 2/2017 | Mecke | G06F 11/3684 |
| 10,108,535 | B2* | 10/2018 | Aggarwal | G06F 11/3672 |
| 10,296,309 | B1* | 5/2019 | Mercilie | G06F 8/30 |
| 10,528,454 | B1* | 1/2020 | Baraty | G06F 17/40 |
| 10,635,572 | B2* | 4/2020 | Yabusaki | G06F 11/3664 |
| 10,713,664 | B1* | 7/2020 | Alagappan | G06Q 30/018 |
| 10,796,276 | B1* | 10/2020 | Singh | G06Q 10/087 |
| 11,068,385 | B2* | 7/2021 | Ahamed | G06N 20/00 |
| 11,178,091 | B1* | 11/2021 | Madhavan | H04L 51/22 |

OTHER PUBLICATIONS

Martin et al, "Automated Testing and Response Analysis of Web Services", IEEE, pp. 1-8 (Year: 2007).*

Dumitrescu: DiPerF: an automated Distributed PERformance testing Framework, IEEE pp. 1-8 (Year: 2004).*

Jensen et al, "Automated Testing with Targeted Event Sequence Generation", ACM, 67-77 (Year: 2013).*

Karim et al, "ProChecker: An Automated Security and Privacy Analysis Framework for 4G LTE Protocol Implementations", IEEE, pp. 773-785 (Year: 2021).*

Mayer et al, "Towards a BPEL unit testing framework", ACM, pp. 33-42 (Year: 2006).*

Fan et al, "Large-Scale Analysis of Framework-Specific Exceptions in Android Apps", ACM, pp. 408-419 (Year: 2018).*

Luo et al, "System Service Call-oriented Symbolic Execution of Android Framework with Applications to Vulnerability Discovery and Exploit Generation", ACM, pp. 225-238 (Year: 2017).*

* cited by examiner

METHOD AND SYSTEM FOR AN AUTOMATED TESTING FRAMEWORK IN DESIGN PATTERN AND VALIDATING MESSAGES

BACKGROUND

1. Field of the Disclosure

This technology generally relates to methods and systems for an automated testing framework, and more particularly to methods and systems for providing an automated testing framework in a publisher/subscriber design pattern to validate messages based on a reusable data model.

2. Background Information

Many business entities utilize network architectures based on microservice applications that include loosely coupled and independently deployable unique services to provide business capabilities. The microservice applications are often developed by using stream-processing platforms that provide a framework to incorporate asynchronous communication models based on data packets and messages. Historically, the use of stream-processing platforms such as, for example, an APACHE KAFKA platform to develop microservice applications have resulted in varying degrees of success with respect to rapid testing of use cases involving asynchronous publishing of messages between microservice applications in a publisher/subscriber design pattern.

One drawback of using conventional testing frameworks such as, for example, a representational state transfer (REST) application programming interface (API) assertion framework is that in many instances, data assertion is not possible to validate published messages whenever a microservice application sends a payload based on a trigger of a certain event such as, for example, a hypertext transfer protocol (HTTP) request hit. The asynchronous publication and consumption of messages do not follow a request/response model. As a result, conventional testing frameworks would not be executable for unit testing.

Therefore, there is a need for a specialized approach to publishing and consuming messages in a publisher/subscriber design pattern, the specialized approach including an automated testing framework that generates a continuous testing platform for message validation of use cases by bootstrapping the publisher and the subscriber to the same runtime environment.

SUMMARY

The present disclosure, through one or more of its various aspects, embodiments, and/or specific features or sub-components, provides, inter alia, various systems, servers, devices, methods, media, programs, and platforms for providing an automated testing framework in a publisher/subscriber design pattern to validate messages based on a reusable data model.

According to an aspect of the present disclosure, a method for providing an automated testing framework to validate a plurality of messages is disclosed. The method is implemented by at least one processor. The method may include receiving, from a developer, at least one electronic resource that may include a feature file relating to a development of an application; identifying, from the at least one electronic resource, at least one set of step definitions relating to a payload test assertion, annotating the at least one set of step definitions to include at least one feature step definition, executing the annotated at least one electronic resource by using an inversion-of-control container based on at least one configuration step definition; loading a message handler object that manages payload listening; transmitting, by using the message handler object, at least one message generated from the execution of the annotated at least one electronic resource to a data structure that maintains a plurality of message queues; and validating the at least one message based on the plurality of message queues.

In accordance with an exemplary embodiment, for the executing, the method may further include invoking a software tool that supports behavior-driven development in a test environment that may include at least one virtual machine; loading at least one class file into the test environment, the at least one class file may include a message handler class file that is annotated based on a predetermined configuration parameter; and binding the inversion-of-control container to the test environment based on the at least one configuration step definition.

In accordance with an exemplary embodiment, the at least one class file may further include at least one organizational unit of bytecode corresponding to the test environment.

In accordance with an exemplary embodiment, the predetermined configuration parameter may include at least one from among a topic parameter, a group parameter, and a partition parameter.

In accordance with an exemplary embodiment, the message handler class file may include a first procedure and a second procedure that are invoked based on a signature.

In accordance with an exemplary embodiment, each of the first procedure and the second procedure may include an object-oriented programming method that represents a behavior of the message handler object.

In accordance with an exemplary embodiment, the first procedure may further include determining whether a message queue of a predetermined data type is present in the data structure; and pushing a variable of the data type into the message queue, wherein the message queue may be generated for the data type when the message queue is not present in the data structure, and wherein a reference of the message queue may be retrieved from the data structure when the message queue is present in the data structure.

In accordance with an exemplary embodiment, the second procedure may further include determining whether a message queue of a predetermined data type is present in the data structure, wherein a reference of the message queue may be returned when the message queue is present in the data structure, and wherein a null value indicating that the message queue does not exist may be returned when the message queue is not present in the data structure.

In accordance with an exemplary embodiment, the application may include at least one from among a monolithic application and a microservice application relating to a service-oriented architecture.

In accordance with an exemplary embodiment, the feature file may include at least one from among an automation test script, a dynamic document that may be continually edited and updated, and a scenario.

According to an aspect of the present disclosure, a computing device configured to implement an execution of a method for facilitating automated testing of event-driven microservices is provided. The computing device comprising a processor; a memory; and a communication interface coupled to each of the processor and the memory, wherein the processor may be configured to: receive, from a developer, at least one electronic resource that may include a feature file relating to a development of an application, identify, from the at least one electronic resource, at least one set of step definitions relating to a payload test assertion; annotate the at least one set of step definitions to include at least one feature step definition; execute the annotated at least one electronic resource by using an inversion-of-control container based on at least one configuration step definition, load a message handler object that manages payload listening; transmit, by using the message handler object, at least one message generated from the execution of the annotated at least one electronic resource to a data structure that maintains a plurality of message queues; and validate the at least one message based on the plurality of message queues.

In accordance with an exemplary embodiment, to execute the annotated at least one electronic resource, the processor may be further configured to invoke a software tool that supports behavior-driven development in a test environment that may include at least one virtual machine; load at least one class file into the test environment, the at least one class file may include a message handler class file that is annotated based on a predetermined configuration parameter; and bind the inversion-of-control container to the test environment based on the at least one configuration step definition.

In accordance with an exemplary embodiment, the at least one class file may further include at least one organizational unit of bytecode corresponding to the test environment.

In accordance with an exemplary embodiment, the predetermined configuration parameter may include at least one from among a topic parameter, a group parameter, and a partition parameter.

In accordance with an exemplary embodiment, the message handler class file may include a first procedure and a second procedure that are invoked based on a signature.

In accordance with an exemplary embodiment, each of the first procedure and the second procedure may include an object-oriented programming method that represents a behavior of the message handler object.

In accordance with an exemplary embodiment, for the first procedure, the processor may be further configured to determine whether a message queue of a predetermined data type is present in the data structure; and push a variable of the data type into the message queue, wherein the message queue may be generated for the data type when the message queue is not present in the data structure, and wherein a reference of the message queue may be retrieved from the data structure when the message queue is present in the data structure.

In accordance with an exemplary embodiment, for the second procedure, the processor may be further configured to determine whether a message queue of a predetermined data type is present in the data structure, wherein a reference of the message queue may be returned when the message queue is present in the data structure, and wherein a null value indicating that the message queue does not exist may be returned when the message queue is not present in the data structure.

In accordance with an exemplary embodiment, the application may include at least one from among a monolithic application and a microservice application relating to a service-oriented architecture.

In accordance with an exemplary embodiment, the feature file may include at least one from among an automation test script, a dynamic document that may be continually edited and updated, and a scenario.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
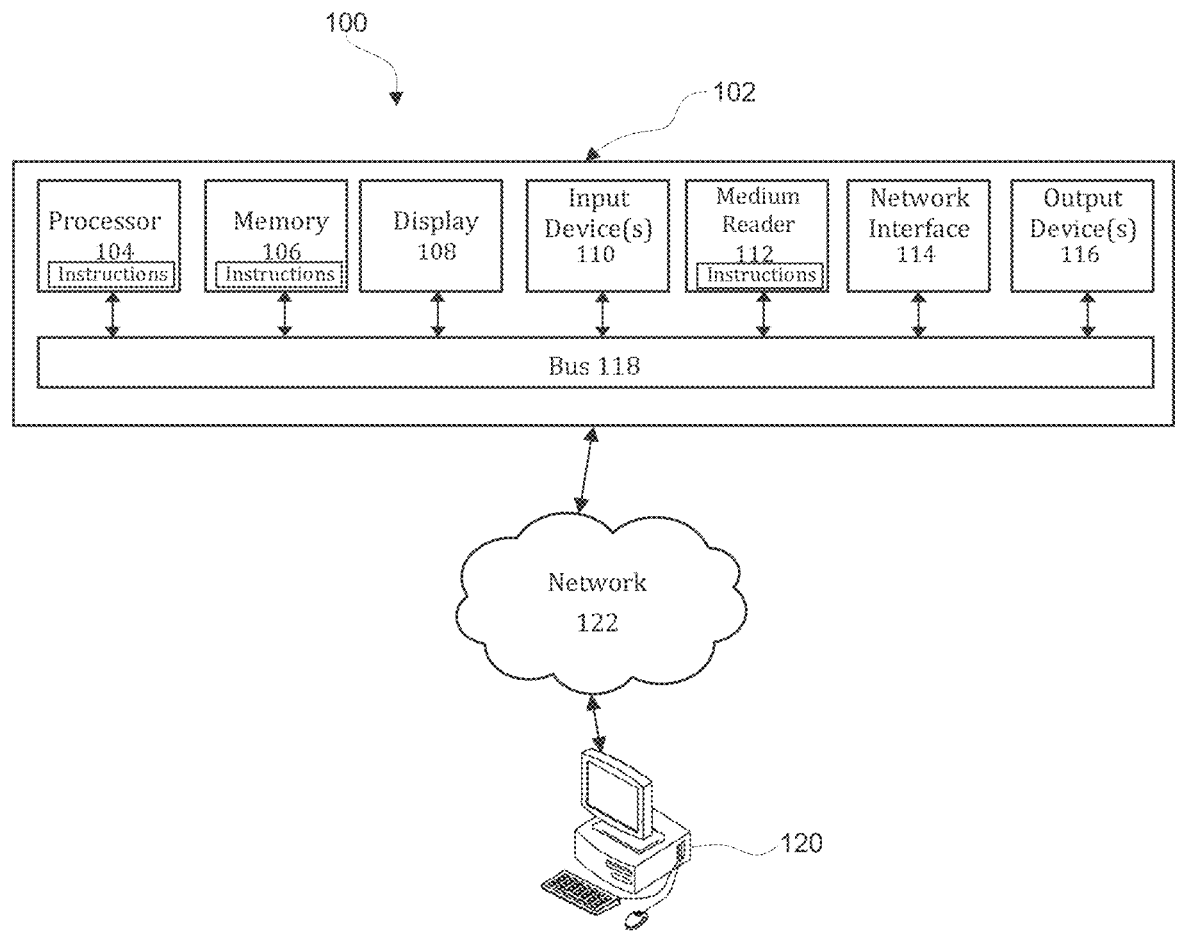
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an automated testing framework in a publisher/subscriber design pattern to validate messages based on a reusable data model.

Figure 2:
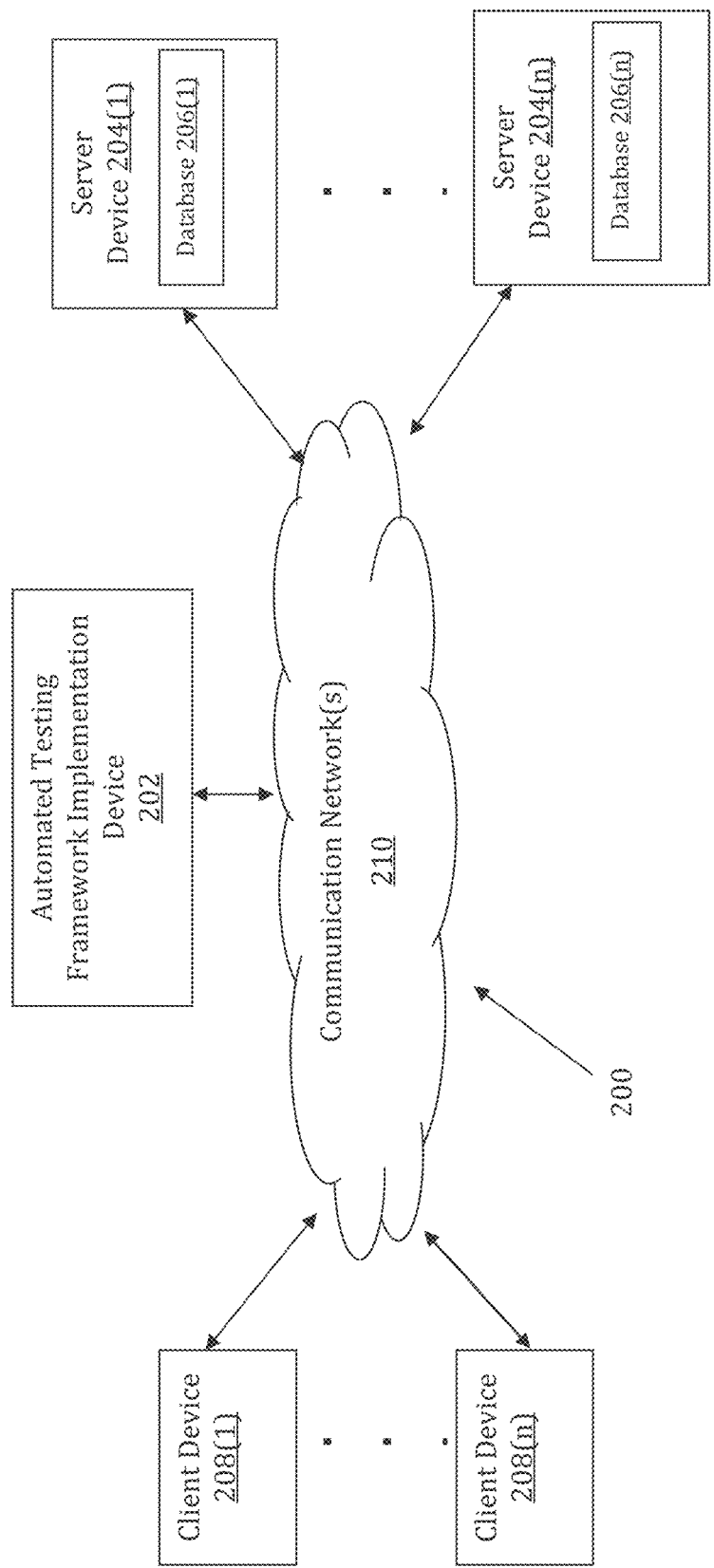
FIG. 2 illustrates an exemplary diagram of a network environment.

Referring to FIG. 2, a schematic of an exemplary network environment 200 for implementing a method for providing an automated testing framework in a publisher/subscriber design pattern to validate messages based on a reusable data model is illustrated. In an exemplary embodiment, the method is executable on any networked computer platform, such as, for example, a personal computer (PC).

The method for providing an automated testing framework in a publisher/subscriber design pattern to validate messages based on a reusable data model may be implemented by an Automated Testing Framework Implementation (ATFI) device 202. The ATFI device 202 may be the same or similar to the computer system 102 as described with respect to FIG. 1. The ATFI device 202 may store one or more applications that can include executable instructions that, when executed by the ATFI device 202, cause the ATFI device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ATFI device 202 itself, may be located in virtual server(s) running in a cloud-based computing environment rather than being tied to one or more specific physical network computing devices. Also, the application(s) may be running in one or more virtual machines (VMs) executing on the ATFI device 202. Additionally, in one or more embodiments of this technology, virtual machine(s) running on the ATFI device 202 may be managed or supervised by a hypervisor.

In the network environment 200 of FIG. 2, the ATFI device 202 is coupled to a plurality of server devices 204(1)-204(n) that hosts a plurality of databases 206(1)-206(n), and also to a plurality of client devices 208(1)-208(n) via communication network(s) 210. A communication interface of the ATFI device 202, such as the network interface 114 of the computer system 102 of FIG. 1, operatively couples and communicates between the ATFI device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ATFI device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ATFI devices that efficiently implement a method for providing an automated testing framework in a publisher/subscriber design pattern to validate messages based on a reusable data model.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ATFI device 202 may be a standalone device or integrated with one or more other devices or apparatuses, such as one or more of the server devices 204(1)-204(n), for example. In one particular example, the ATFI device 202 may include or be hosted by one of the server devices 204(1)-204(n), and other arrangements are also possible. Moreover, one or more of the devices of the ATFI device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ATFI device 202 via the communication network(s) 210 according to the HTTP-based and/or JAVASCRIPT OBJECT NOTATION (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to feature step definitions, class files, configuration parameters, and data queue structures.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(l)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ATFI device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ATFI device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ATFI device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ATFI device 202, the server devices 204(1)-204(n), or the client devices 208(1)-208(n), for example, may be configured to operate as virtual instances on the same physical machine. In other words, one or more of the ATFI device 202, the server devices 204(1)-204(n), or the client devices 208(1)-208(n) may operate on the same physical device rather than as separate devices communicating through communication network(s) 210. Additionally, there may be more or fewer ATFI devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
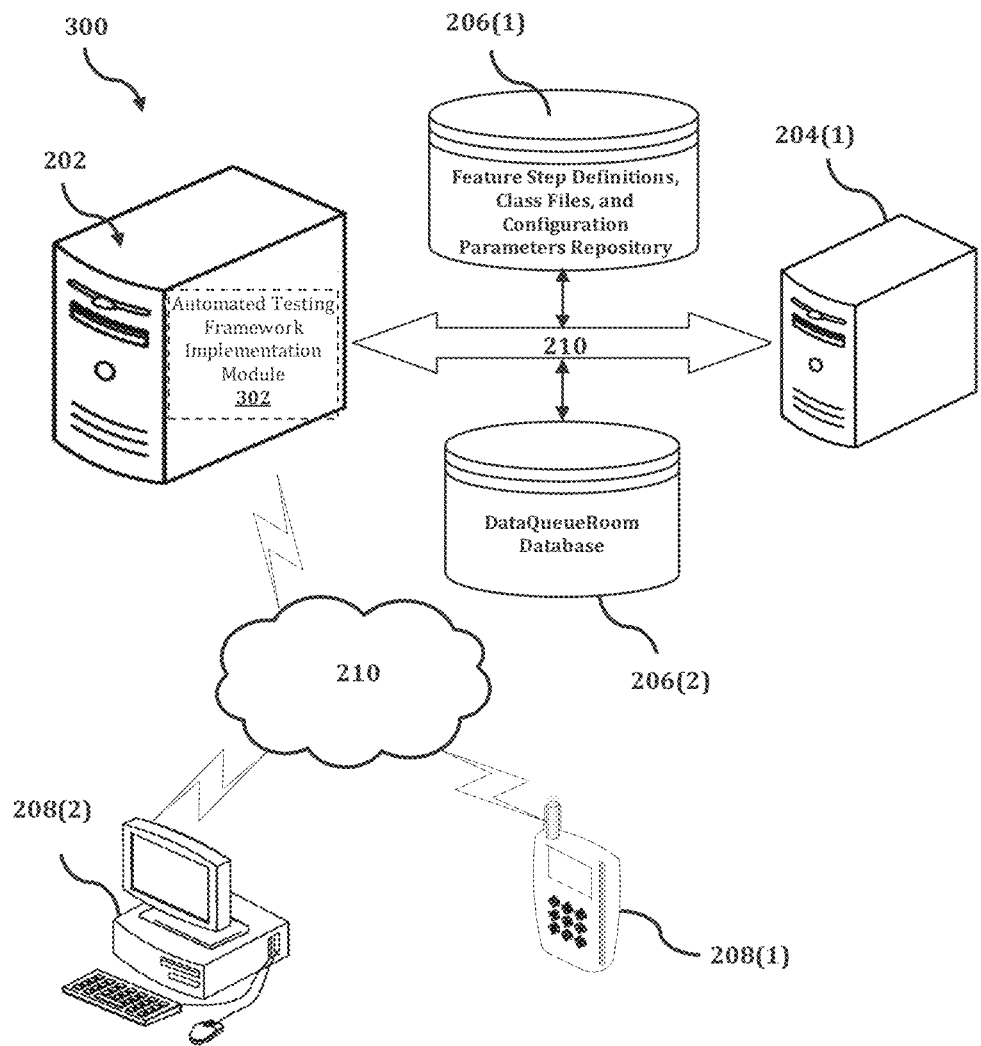
FIG. 3 shows an exemplary system for implementing a method for providing an automated testing framework in a publisher/subscriber design pattern to validate messages based on a reusable data model.

The ATFI device 202 is described and shown in FIG. 3 as including an automated testing framework implementation module 302, although it may include other rules, policies, modules, databases, or applications, for example. As will be described below, the automated testing framework implementation module 302 is configured to implement a method for providing an automated testing framework in a publisher/subscriber design pattern to validate messages based on a reusable data model.

An exemplary process 300 for implementing a mechanism for providing an automated testing framework in a publisher/subscriber design pattern to validate messages based on a reusable data model by utilizing the network environment of FIG. 2 is shown as being executed in FIG. 3. Specifically, a first client device 208(1) and a second client device 208(2) are illustrated as being in communication with ATFI device 202. In this regard, the first client device 208(1) and the second client device 208(2) may be "clients" of the ATFI device 202 and are described herein as such. Nevertheless, it is to be known and understood that the first client device 208(1) and/or the second client device 208(2) need not necessarily be "clients" of the ATFI device 202, or any entity described in association therewith herein. Any additional or alternative relationship may exist between either or both of the first client device 208(1) and the second client device 208(2) and the ATFI device 202, or no relationship may exist.

Further, ATFI device 202 is illustrated as being able to access a feature step definitions, class files, and configuration parameters repository 206(1) and a DataQueueRoom database 206(2). The automated testing framework implementation module 302 may be configured to access these databases for implementing a method for providing an automated testing framework in a publisher/subscriber design pattern to validate messages based on a reusable data model.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ATFI device 202 via broadband or cellular communication. Of course, these embodiments are merely exemplary and are not limiting or exhaustive.

Upon being started, the automated testing framework implementation module 302 executes a process for providing an automated testing framework in a publisher/subscriber design pattern to validate messages based on a reusable data model. An exemplary process for providing an automated testing framework in a publisher/subscriber design pattern to validate messages based on a reusable data model is generally indicated at flowchart 400 in FIG. 4.

Figure 4:
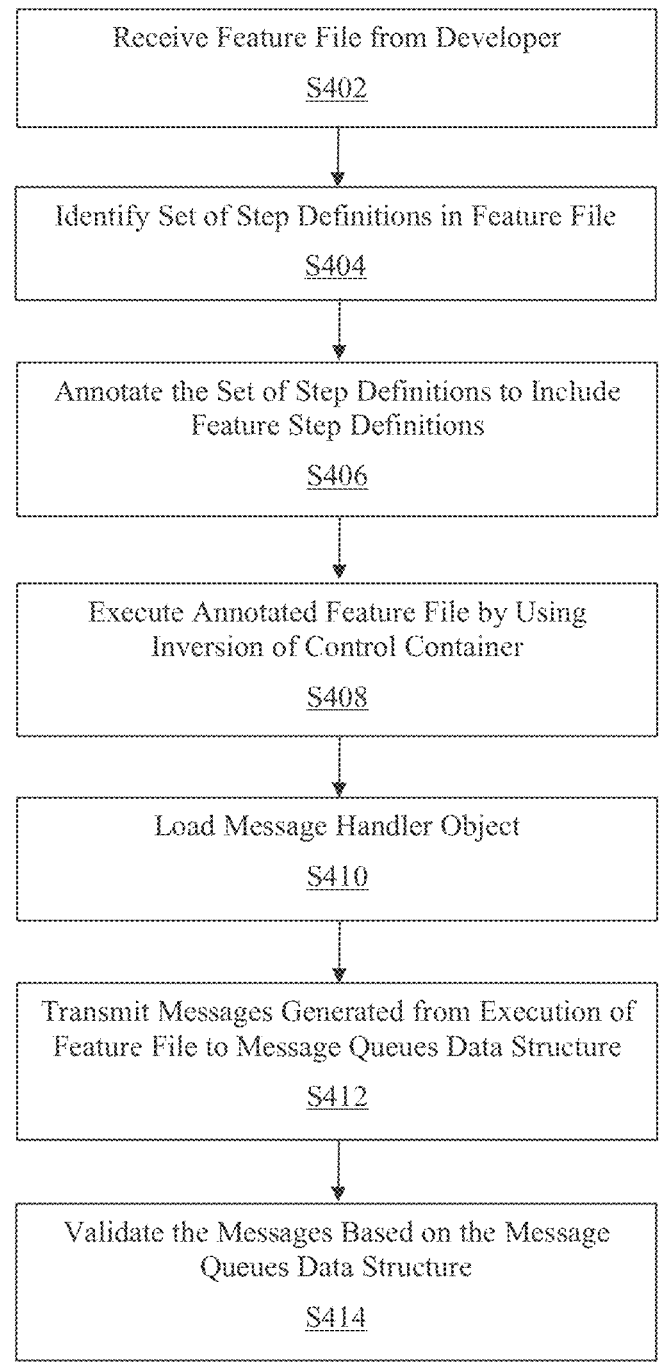
FIG. 4 is a flowchart of an exemplary process for implementing a method for providing an automated testing framework in a publisher/subscriber design pattern to validate messages based on a reusable data model.

In the process 400 of FIG. 4, at step S402, an electronic resource that includes a feature file relating to the development of an application may be received from a developer. The feature file may be received from a developer in a testing environment such as, for example, a CUCUMBER testing environment. In an exemplary embodiment, the developer may create the feature file by using a programming language such as, for example, a SCALA programming language and a JAVA programming language. The programming language may be class-based, object-oriented, and designed to have as few implementation dependencies as possible. As will be appreciated by a person of ordinary skill in the art, the programming language may include any programming language providing support for both object-oriented programming and functional programming.

In another exemplary embodiment, a feature file may serve as an automation test script in a testing environment and may contain a scenario or a list of scenarios. The feature file may include scripts as well as descriptions of tests in a descriptive language such as, for example, an English language. In another exemplary embodiment, the feature file may include stories and features such as, for example, a login action. The feature file may utilize a special file extension such as, for example, a ".feature" file extension to enable recognition of the feature file by a testing environment. In another exemplary embodiment, the feature file may include a dynamic document that may be continually edited and updated such as, for example, a live document. The live document may include definitions of the features in the feature file. In another exemplary embodiment, a feature file may be included in an electronic resource such as, for example, a computer file for recording data discretely in a computer storage device. The electronic resource may be edited and transferred via a network to other connected computing devices.

In another exemplary embodiment, the feature file may relate to the development of an application such as, for example, a monolithic application and a microservice application in an enterprise network. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities in another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography performs its actions independently and does not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals, which communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, a set of step definitions relating to a message payload test assertion may be identified from the at least one electronic resource. In an exemplary embodiment, the set of step definitions may include implementation definitions or step definitions for each step in the feature file of the electronic resource. The testing environment may execute a step in the feature file by identifying a corresponding step definition to execute. In another exemplary embodiment, a set of step definitions may include a small piece of code with a pattern. The set of step definitions may correspond to a procedure such as, for example, a JAVA method in a class file with an annotation. In another exemplary embodiment, the annotation and the pattern may be used to link the set of step definitions to the matching steps in the feature file.

In another exemplary embodiment, the message payload test assertion may include a predicate connected to a point in the payload. The predicate may be designed to be evaluated as true at a point in code execution corresponding to the point in the payload. In another exemplary embodiment, the predicate may include a Boolean-value function over the state space and may be expressed as a logical proposition by using the variables of a computer program. As will be appreciated by a person of ordinary skill in the art, the payload test assertion may facilitate the detection of defects in the payload by a test environment.

At step S406, the identified set of step definitions may be annotated to include a feature step definition. In an exemplary embodiment, annotation may include syntactic metadata that can be added to source code. For computer programing languages such as, for example, a JAVA computing language, the annotations may be read from source files and may be embedded in, as well as read from, class files generated by a compiler. As will be appreciated by a person of ordinary skill in the art, source codes of computer files such as, for example, class files, methods, variables, parameters, and payloads may be annotated.

In another exemplary embodiment, a feature step definition may include implementation definitions for the execution of the feature file on a stream-processing software platform such as, for example, the APACHE KAFKA platform. The feature step definition may facilitate effective execution of the feature file in the stream-processing software platform. In another exemplary embodiment, the feature step definition may be automatically generated for each feature file. The feature step definition may be automatically generated based on information relating to the user such as, for example, a user testing activity as well as information relating to the feature file such as, for example, the feature to be tested by the feature file. In another exemplary embodiment, the feature step definition may be generated in advance and stored in a database. The stored feature step definition may be identified and retrieved from the database based on the feature file.

At step S408, the annotated electronic resource may be executed by using an inversion of control container based on a configuration step definition. In an exemplary embodiment, a software tool such as, for example, a CUCUMBER software tool may be used to execute the annotated electronic resource. The software tool may support behavior-driven development and may be invoked in a test environment that includes a virtual machine such as, for example, a JAVA VIRTUAL MACHINE (JVM). Once the software tool has been invoked, class files may be loaded into the test environment. In another exemplary embodiment, the class files may include a message handler class file that is annotated based on a predetermined configuration parameter. Then, the inversion of control container such as, for example, a SPRING context container may also be executed and bound to the test environment based on the configuration step definition.

In another exemplary embodiment, the software tool may be automatically executed based on the feature step definition in the annotated electronic resource. The software tool may enable the creation of test scripts in a natural language such as, for example, an English language, to test applications by using scenarios. In another exemplary embodiment, the software tool may be executed by a user based on a selection in a graphical user interface.

In another exemplary embodiment, the virtual machine upon which the software tool may be loaded to test the annotated electronic resource may include a JAVA virtual machine (JVM). The JVM may enable a computer to run JAVA programs as well as programs written in other computing languages which are compiled to JAVA bytecode. In another exemplary embodiment, the JVM may be defined by a JVM specification. The JVM specification may formally describe what is required in a JVM implementation and may ensure interoperability of JAVA programs across different implementations. As will be appreciated by a person of ordinary skill in the art, the virtual machine may include commercially supported JVM software such as, for example Oracle's JVM software based on an OPENJDK implementation, as well as proprietary JVM software.

In another exemplary embodiment, the class files may include a computer file comprising JAVA bytecode that may be executed on the JVM. The class files may be generated by a compiler from programing language source files that contains JAVA classes. In another exemplary embodiment, class files may include any number of procedures and/or methods to access the value of various kinds of other procedures and/or methods. Class files may include variable types such as, for example, local variables that are defined inside of methods, constructors, or blocks, instance variables that are within a class but outside of any method, and class variables that are declared within a class, outside of any method, with the static keyword. In another exemplary embodiment, class files compiled on one platform may be executed on the JVM of another platform. JAVA applications may include platform agnostic applications due to the platform independence of the class files. In another exemplary embodiment, the class files may include a blueprint and/or a template from which individual objects are created.

In another exemplary embodiment, the class files may include a message handler class file that is annotated based on a predetermined configuration parameter. The predetermined configuration parameter may include a topic parameter, a group parameter, and a partition parameter. In another exemplary embodiment, the message handler class file may include a first procedure and a second procedure. The first procedure and the second procedure may include an object-oriented programming method that represents a behavior of the message handler object. The first procedure and the second procedure may be invoked based on a signature that is part of a declaration. In an exemplary embodiment, the signature may include a combination of a procedure name and a parameter list.

In another exemplary embodiment, the inversion of control container such as, for example, a SPRING context may be used for instantiating, configuring, and assembling objects and beans by reading configuration metadata from computing codes such as, for example, an Extensible Markup Language (XML) code, a JAVA annotations code, and a JAVA code in the configuration step definition. The inversion of control container may invert the flow of control such that the framework calls into the task-specific code. In another exemplary embodiment, the inversion of control increases modularity of the application and may make the application extensible. The modularity of the application may be utilized by programming paradigms such as, for example, the object-oriented programing paradigm. In another exemplary embodiment, the inversion of control container may be included as a part of a framework such as, for example, a SPRING framework that includes an application framework and an inversion of control container for the JAVA platform. The SPRING framework may include modules such as, for example, a SPRING core container, an inversion of control container, a model-view-container, etc.

At step S410, a message handler object that manages payload listening may be loaded. In an exemplary embodiment, the message handler object may include a bean that may also be loaded as a part of the inversion of control container. The message handler object may perform listening functions relating to the management and control of application message payloads. In another exemplary embodiment, the message handler object may include states and behaviors. The message handler object may include an instance of the message handler class. In another exemplary embodiment, the message handler object may include event listeners. The event listeners may represent interfaces responsible for the handling of events.

At step S412, a message generated from the execution of the annotated electronic resource may be transmitted to a data structure that maintains a plurality of message queues by using the message handler object. In an exemplary embodiment, the procedures and/or methods that are invoked in previous steps above may manage and control how the message payloads are handled. The procedures and/or methods may push the messages to a data structure that maintains a plurality of message queues such as, for example, a JAVA DataQueueRoom.

In another exemplary embodiment, messaging may include a process of communication between software components or between applications. A messaging system may include a peer-to-peer facility such that a messaging client may send messages to, and receive messages from, any other client. Each messaging client may connect to a messaging agent that provides facilities for creating, sending, receiving, and reading messages. In another exemplary embodiment, messaging may enable distributed communication that is loosely coupled. A component may send a message to a destination, and the recipient may retrieve the message from the destination, which enables communication between the sender and the receiver even when the sender and the receiver are not available at the same time. In another exemplary embodiment, the message may be communicated synchronously and asynchronously between software components. In asynchronous communication, a software component may put a message in a message queue and continues processing without requiring an immediate response. In synchronous communication, the software component sends the message to another software component and waits for a response before continuing to process the next set of instructions.

In another exemplary embodiment, the data structure that maintains a plurality of message queues may include a publish-and-subscribe model and a point-to-point model. In a publish-and-subscribe model, messages may be published to a particular message topic. Subscribers may register interest in receiving messages published on a particular message topic. In this model, neither the publisher nor the subscriber knows about each other. In a point-to-point model, messages may be routed to individual consumers that maintain queues of incoming messages. Each message may be addressed to a specific queue and the receiving client may extract messages from the queues established to hold the client's messages. As such, each message may be consumed by one consumer.

In another exemplary embodiment, the first procedure from step S408 may further include a determination of whether a message queue of a predetermined data type is present in the data structure and then pushing a variable of the datatype into the message queue. When the message queue is not present in the data structure, the message queue may be generated for the data type to facilitate the pushing of the variable. Else, when the message queue is present in the data structure, a reference of the message queue may be retrieved from the data structure to facilitate the pushing of the variable. As will be appreciated by a person of ordinary skill in the art, the first procedure may correspond to a DataQueRoom method such as, for example, a PushTo-Queue JAVA method.

At step S414, the message may be validated based on the plurality of message queues. In an exemplary embodiment, the message may be validated by using validation techniques such as, for example, by comparing a published message from a producer with a message received by the consumer. In another exemplary embodiment, the message may be validated by using an assertion technique to ensure correctness of any assumptions in an application. The assertion may be assumed to be true when it is executed and may return an error value when the assertion is false.

In another exemplary embodiment, the second procedure from step S408 may further include a determination of whether a message queue of a predetermined data type is present in the data structure. When the message queue is present in the data structure, a reference of the message queue may be returned as a successful result of the assertion. Else, when the message queue is not present in the data structure, a null value indicating that the message queue does not exist may be returned as an unsuccessful result of the assertion.

Figure 5:
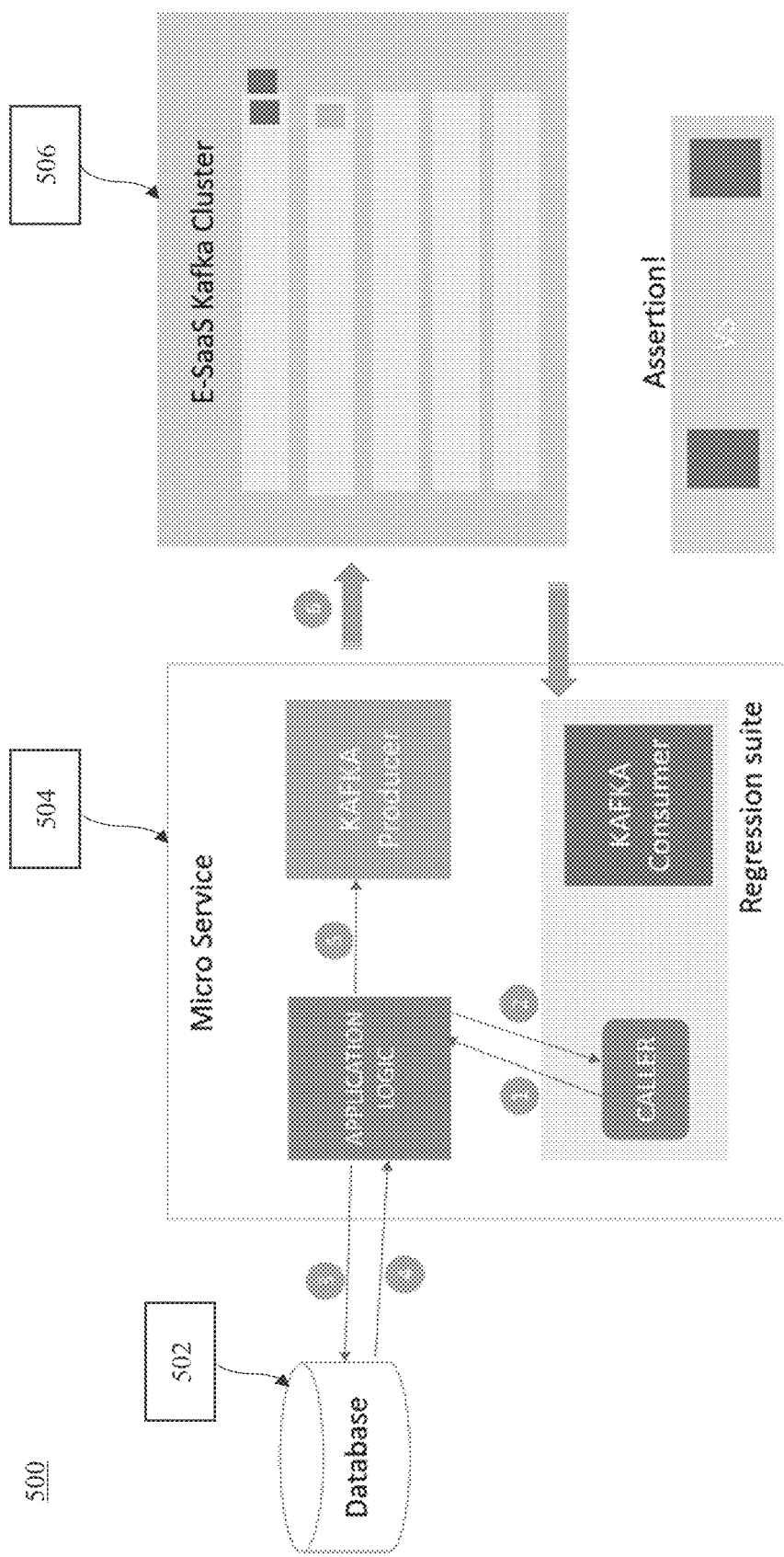
FIG. 5 is a flow diagram that illustrates an exemplary system that is usable for implementing a method for providing an automated testing framework in a publisher/subscriber design pattern to validate messages based on a reusable data model.

FIG. 5 is a flow diagram that illustrates an exemplary system 500 that is usable for implementing a method for providing an automated testing framework in a publisher/subscriber design pattern to validate messages based on a reusable data model. The exemplary system 500 in FIG. 5 includes a database 502, a microservice 504, and an enterprise streaming as a service (E-SaaS) KAFKA cluster 506. The microservice 504 operates within a regression test suite and incorporates a KAFKA consumer together with a KAFKA producer in a single microservice. In an exemplary embodiment, the regression test suit may include a set of test scenarios designed to ensure that the microservice is accurate and correct after undergoing corrections or changes. The microservice 504 may also include application logic such as, for example, a message handler to control workflows and manage the stream-processing. In another exemplary embodiment, the application logic may include application specific coordination of domain and infrastructure components according to the requirements of the application.

In steps 1 and 2 of FIG. 5, a caller of the KAFKA consumer communicates with the application logic. In another exemplary embodiment, the caller may include computer code such as, for example, a procedure and/or a method of the KAFKA consumer that calls on another computer code to perform a function such as, for example, retrieve information from a database. In steps 3 and 4, the application logic coordinates with the database to retrieve the requested information. In step 5, the application logic passes the retrieved information to the KAFKA producer. In step 6, the KAFKA producer publishes messages that include the retrieved information to an E-SaaS KAFKA cluster. In another exemplary embodiment, the KAFKA producer pushes the published messages to at least one KAFKA topic in the E-SaaS KAFKA cluster. Then, the KAFKA consumer may perform assertion on the published messages in the E-SaaS KAFKA cluster by comparing the messages in the KAFKA topic with an expected message based on the call made by the caller.

Figure 6:
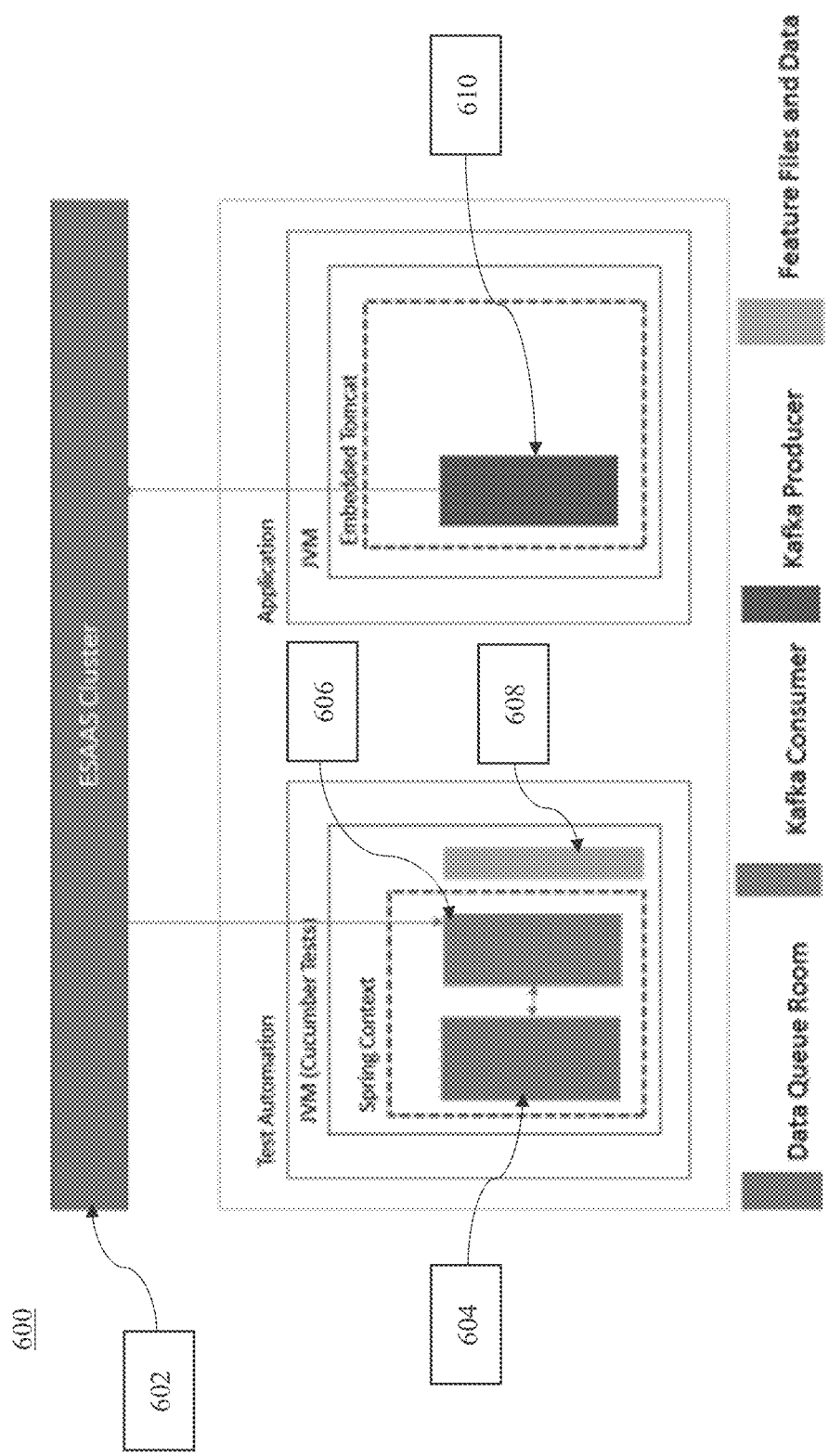
FIG. 6 is a technical component diagram that illustrates an exemplary system that is usable for implementing a method for providing an automated testing framework in a publisher/subscriber design pattern to validate messages based on a reusable data model.

FIG. 6 is a technical component diagram that illustrates an exemplary system 600 that is usable for implementing a method for providing an automated testing framework in a publisher/subscriber design pattern to validate messages based on a reusable data model. The exemplary system 600 in FIG. 6 includes an enterprise streaming as a service (ESAAS) cluster 602, a Data Queue Room 604, a KAFKA consumer 606, feature files and data 608, and a KAFKA producer 610. The exemplary system supports seamless integration between test environments and custom test scenarios created by a developer for an application project and leverages an internal framework of producers and consumers to validate message payloads. Additionally, by setting up and initializing the producers and the consumers in the same workspace as the application project, an alternate runtime is not needed. As will be appreciated by a person of ordinary skill in the art, this non-invasive framework of producers and consumers do not impact core logic and business specific functions of the application project.

In FIG. 6, Data Queue Room 604 and KAFKA consumer 606 operate within an inversion of control container such as, for example, a SPRING context. The SPRING context is an element of a software tool such as, for example, a CUCUMBER tests tool that facilitates the testing of feature files and data 608 on a JAVA virtual machine (JVM). The CUCUMBER tests tool, together with the software components within the CUCUMBER tests tool, form the test automation component usable for the testing of an application. In FIG. 6, the application to be tested similarly operates on a JVM and includes an embedded TOMCAT that hosts the KAFKA producer 610. In an exemplary embodiment, the embedded TOMCAT may include a server that combines a JAVA web application with a TOMCAT server distribution. The embedded TOMCAT may offer a technique for packaging JAVA web applications that is consistent with a microservices-based software development approach. The test automation component and the application to be tested communicate by publishing and consuming messages from the ESAAS cluster 602. As will be appreciated by a person of ordinary skill in the art, FIG. 6 is a technical component diagram usable to perform the steps outlined in FIG. 5.

Accordingly, with this technology, an optimized process for providing an automated testing framework in a publisher/subscriber design pattern to validate messages based on a reusable data model is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an automated testing framework to validate a plurality of messages, the method being implemented by at least one processor, the method comprising:
   receiving, by the at least one processor from a developer, at least one electronic resource that includes a feature file relating to a development of an application;
   identifying, by the at least one processor from the at least one electronic resource, at least one set of step definitions relating to a payload test assertion;
   annotating, by the at least one processor, the at least one set of step definitions to include at least one feature step definition;
   executing, by the at least one processor using an inversion-of-control container, the annotated at least one electronic resource based on at least one configuration step definition by,
      loading, by the at least one processor, a message handler class file;
      binding, by the at least one processor, the inversion-of-control container to a test environment based on the at least one configuration step definition;
      determining, by the at least one processor, whether a message queue of a predetermined data type is present in a data structure;
      generating, by the at least one processor, the message queue for the predetermined data type when the message queue is not present in the data structure; and
      pushing, by the at least one processor, a variable of the predetermined data type into the message queue;
   loading, by the at least one processor, a message handler object that manages payload listening;
   transmitting, by the at least one processor using the message handler object, at least one message generated from the executing of the annotated at least one electronic resource to the data structure that maintains a plurality of message queues; and
   validating, by the at least one processor, the at least one message based on the plurality of message queues.

2. The method of claim 1, wherein the executing further comprises:
   invoking, by the at least one processor, a software tool that supports behavior-driven development in the test environment that includes at least one virtual machine;
   loading, by the at least one processor, at least one class file into the test environment, the at least one class file including the message handler class file that is annotated based on a predetermined configuration parameter; and
   binding, by the at least one processor, the inversion-of-control container to the test environment based on the at least one configuration step definition.

3. The method of claim 2, wherein the at least one class file further includes at least one organizational unit of bytecode corresponding to the test environment.

4. The method of claim 2, wherein the predetermined configuration parameter includes at least one from among a topic parameter, a group parameter, and a partition parameter.

5. The method of claim 2, wherein the message handler class file includes a first procedure and a second procedure that are invoked based on a signature.

6. The method of claim 5, wherein each of the first procedure and the second procedure includes an object-oriented programming method that represents a behavior of the message handler object.

7. The method of claim 5, wherein the first procedure further comprises:
   determining, by the at least one processor, whether the message queue of the predetermined data type is present in the data structure; and
   pushing, by the at least one processor, the variable of the predetermined data type into the message queue,
   wherein the message queue is generated for the predetermined data type when the message queue is not present in the data structure, and
   wherein a reference of the message queue is retrieved from the data structure when the message queue is present in the data structure.

8. The method of claim 5, wherein the second procedure further comprises:
   determining, by the at least one processor, whether the message queue of the predetermined data type is present in the data structure,
   wherein a reference of the message queue is returned when the message queue is present in the data structure, and
   wherein a null value indicating that the message queue does not exist is returned when the message queue is not present in the data structure.

9. The method of claim 1, wherein the application includes at least one from among a monolithic application and a microservice application relating to a service-oriented architecture.

10. The method of claim 1, wherein the feature file includes at least one from among an automation test script, a dynamic document that is continually edited and updated, and a scenario.

11. A computing device configured to implement an execution of a method for providing an automated testing framework to validate a plurality of messages, the computing device comprising:
   a processor;
   a memory; and
   a communication interface coupled to each of the processor and the memory,
   wherein the processor is configured to:
   receive, from a developer, at least one electronic resource that includes a feature file relating to a development of an application;
   identify, from the at least one electronic resource, at least one set of step definitions relating to a payload test assertion;
   annotate the at least one set of step definitions to include at least one feature step definition;
   execute, by using an inversion-of-control container, the annotated at least one electronic resource by using an inversion-of-control container based on at least one configuration step definition by causing the processor to:

load a message handler class file;
binding, by the at least one processor, the inversion-of-control container to a test environment based on the at least one configuration step definition;
determine whether a message queue of a predetermined data type is present in a data structure;
generate the message queue for the predetermined data type when the message queue is not present in the data structure; and push a variable of the predetermined data type into the message queue;
load a message handler object that manages payload listening;
transmit, by using the message handler object, at least one message generated from the executing of the annotated at least one electronic resource to the data structure that maintains a plurality of message queues; and
validate the at least one message based on the plurality of message queues.

12. The computing device of claim 11, wherein, to execute the annotated at least one electronic resource, the processor is further configured to:
invoke a software tool that supports behavior-driven development in the a test environment that includes at least one virtual machine;
load at least one class file into the test environment, the at least one class file including the message handler class file that is annotated based on a predetermined configuration parameter; and
bind the inversion-of-control container to the test environment based on the at least one configuration step definition.

13. The computing device of claim 12, wherein the at least one class file further includes at least one organizational unit of bytecode corresponding to the test environment.

14. The computing device of claim 12, wherein the predetermined configuration parameter includes at least one from among a topic parameter, a group parameter, and a partition parameter.

15. The computing device of claim 12, wherein the message handler class file includes a first procedure and a second procedure that are invoked based on a signature.

16. The computing device of claim 15, wherein each of the first procedure and the second procedure includes an object-oriented programming method that represents a behavior of the message handler object.

17. The computing device of claim 15, wherein, for the first procedure, the processor is further configured to:
determine whether the message queue of the predetermined data type is present in the data structure; and
push the variable of the predetermined data type into the message queue,
wherein the message queue is generated for the predetermined data type when the message queue is not present in the data structure, and
wherein a reference of the message queue is retrieved from the data structure when the message queue is present in the data structure.

18. The computing device of claim 15, wherein, for the second procedure, the processor is further configured to:
determine whether the message queue of the predetermined data type is present in the data structure,
wherein a reference of the message queue is returned when the message queue is present in the data structure, and
wherein a null value indicating that the message queue does not exist is returned when the message queue is not present in the data structure.

19. The computing device of claim 11, wherein the application includes at least one from among a monolithic application and a microservice application relating to a service-oriented architecture.

20. The computing device of claim 11, wherein the feature file includes at least one from among an automation test script, a dynamic document that is continually edited and updated, and a scenario.

* * * * *